United States Patent [19]  [11] 4,286,133
Einset et al.  [45] Aug. 25, 1981

[54] BI-ROTATIONAL MICROWAVE OVEN TURNTABLE/ROTISSERIE

[75] Inventors: Eystein Einset, St. Joseph; James R. Hageman, Berrien Springs, both of Mich.

[73] Assignee: Whirlpool Corporation, Benton Harbor, Mich.

[21] Appl. No.: 42,770

[22] Filed: May 29, 1979

[51] Int. Cl.³ .............................................. H05B 6/78
[52] U.S. Cl. ....................... 219/10.55 F; 219/10.55 E; 219/389; 99/421 P; 99/421 V; 126/41 A; 126/338
[58] Field of Search .................. 219/10.55 F, 10.55 E, 219/10.55 R, 10.55 A, 10.55 M, 389, 392; 99/421 P, 421 V, 421 H, 421 HH, 421 HV, 421 R, 451; 126/338, 41 A, 41 B, 25 AA, 181, 182, 149, 15 D

[56] References Cited

U.S. PATENT DOCUMENTS

| 1,738,328 | 12/1929 | Spielman | 99/421 |
|---|---|---|---|
| 1,838,545 | 12/1931 | Guffey | 99/421 P |
| 2,040,016 | 5/1936 | Sanders | 99/421 P |
| 2,632,838 | 3/1953 | Schroeder | 219/10.55 F |
| 3,091,172 | 5/1963 | Wildemann | 99/427 |
| 3,172,987 | 3/1965 | Fitzmayer | 219/10.55 F |
| 3,300,615 | 1/1967 | Smith | 219/10.55 R |
| 3,333,530 | 8/1967 | Reuther | 99/339 |
| 3,427,422 | 2/1969 | Müller | 219/10.55 R |
| 3,440,385 | 4/1969 | Smith | 219/10.55 R |
| 3,535,483 | 10/1970 | Puschner | 219/10.55 A |
| 3,626,135 | 12/1971 | Fitzmayer | 219/10.55 F |
| 3,744,403 | 7/1973 | Castronuovo | 219/389 X |
| 4,036,151 | 7/1977 | Shin | 108/20 |
| 4,037,070 | 7/1977 | Kirpichnikov et al. | 219/10.55 A |
| 4,092,512 | 5/1978 | Suzuki et al. | 219/10.55 F |
| 4,131,778 | 12/1978 | Tanaka et al. | 219/10.55 F |
| 4,136,271 | 1/1979 | Tanaka et al. | 219/10.55 F |
| 4,137,442 | 1/1979 | Tateda | 219/10.55 B |

FOREIGN PATENT DOCUMENTS 2086 of 1860 United Kingdom .................. 99/421 P

*Primary Examiner*—Gerald P. Tolin
*Assistant Examiner*—Philip H. Leung
*Attorney, Agent, or Firm*—Wegner, Stellman, McCord, Wiles & Wood

[57] ABSTRACT

A bi-rotational microwave oven turntable/rotisserie having a turntable which is moved in a closed path within the oven cavity while being concurrently rotated about a central axis of the turntable. A rotisserie device is associated with the turntable and includes a spit portion which is caused to rotate about the longitudinal axis thereof as an incident of rotation of the turntable about its central axis. The rotisserie, in turn, is rotated about a fixed axis defined by an input drive shaft. The turntable may be rotated by a gear meshing with a tooth portion of a hub journaling the drive shaft. The gear defines an axis of rotation of the turntable which may be rotatably carried on a support portion of the rotisserie device. The turntable may have a toothed periphery meshing with a tooth member fixed to the rotisserie spit portion for effecting rotation of the spit portion as an incident of rotation of the turntable relative to the support portion. The turntable is disposed subjacent the spit portion and the dish configuration thereof may serve to receive and collect juices dropping from the food products on the spit portion as well as for retaining juices and the like expressed from the food products carried on the turntable itself.

22 Claims, 4 Drawing Figures

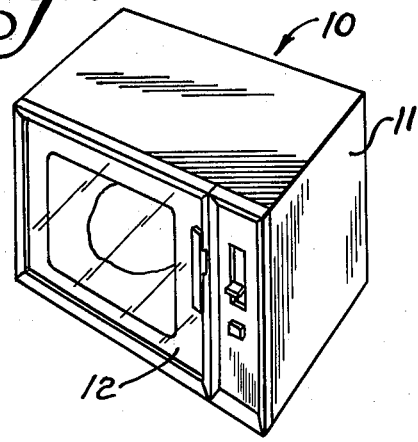
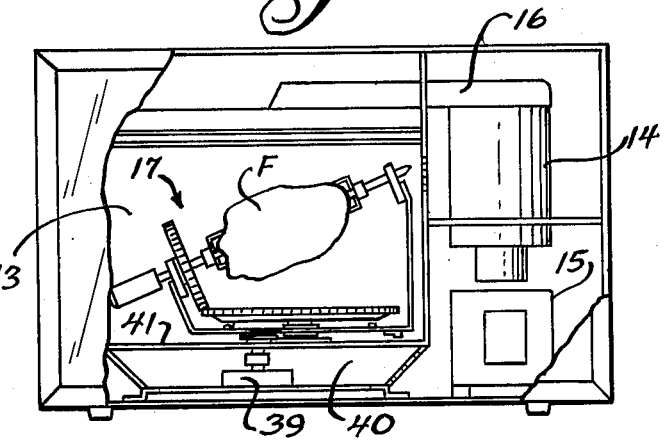
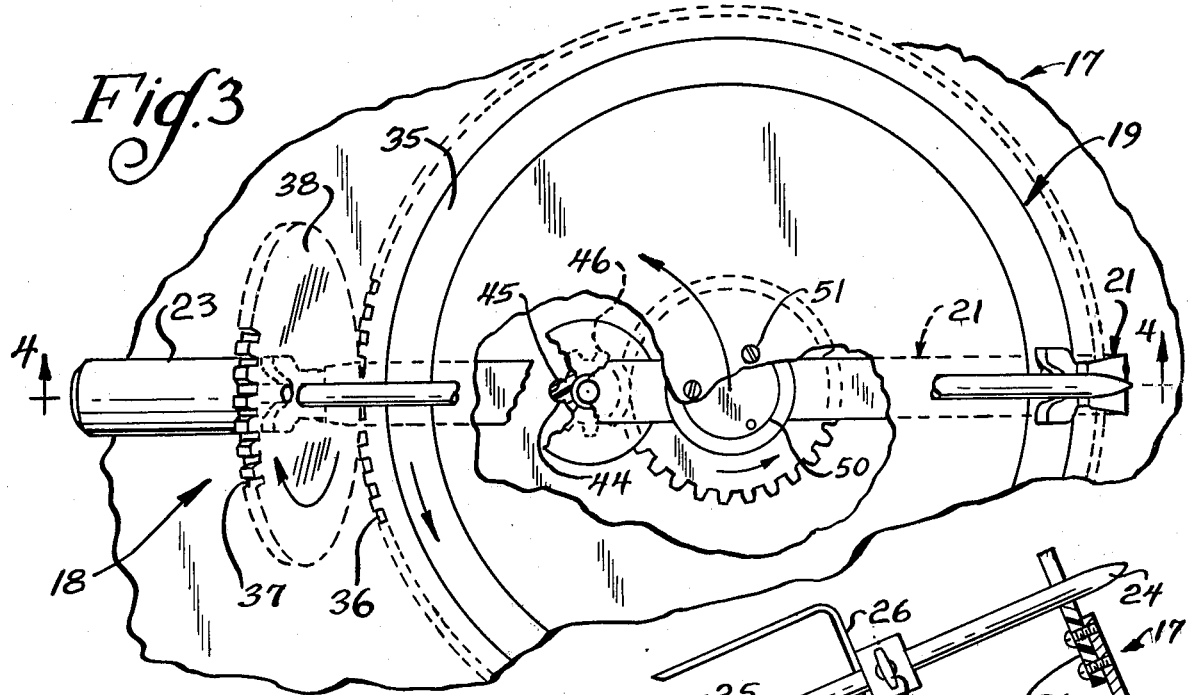
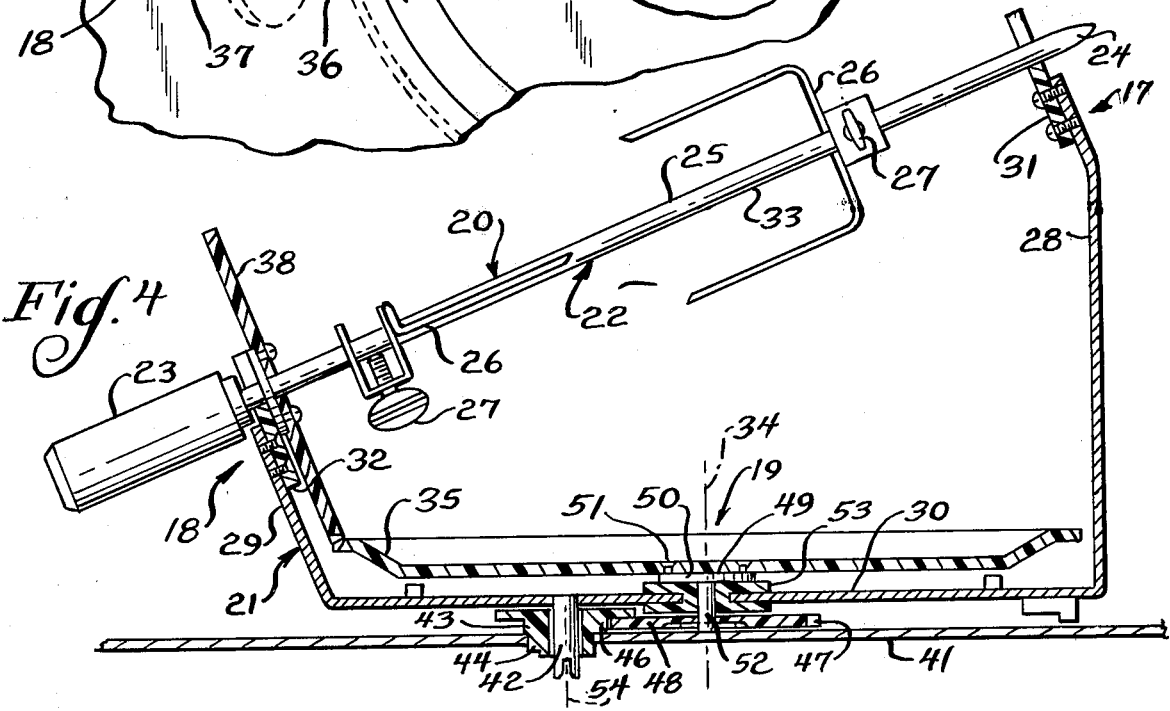

BI-ROTATIONAL MICROWAVE OVEN TURNTABLE/ROTISSERIE

BACKGROUND OF THE INVENTION

1. Field of the Invention

This invention relates to microwave ovens and in particular to means for movably carrying food products in the oven cavity thereof.

2. Description of the Prior Art

It has been conventional to provide gear drives for rotating the spit portion of a rotisserie for roasting meat and the like. One example of such a structure is shown in U.S. Pat. No. 1,738,328 of Milton H. Spielman.

It has further been conventional to utilize microwave electromagnetic radiation for heating food products and the like. One example thereof is illustrated in U.S. Pat. No. 3,091,172 of Max Wildemann wherein sausages are heated by microwave energy as they are passed through a waveguide while being turned about their longitudinal axes.

It is further conventional to rotate objects being heated by microwave radiation in a microwave oven cavity, as illustrated in U.S. Pat. No. 2,632,838 of George W. Schroeder.

The use of such a rotatable platform in an oven for cooking food products and the like is illustrated in U.S. Pat. No. 3,172,987 of Louis H. Fitzmayer.

Albert H. Reuther shows, in U.S. Pat. No. 3,333,530, a multiple domestic appliance combination wherein a rotisserie is provided in an oven portion thereof, which rotisserie includes a spit driven by a suitable motor mounted in the rear wall of the range.

Herbert A. Puschner teaches the use of a traveling conveyor for heating foodstuffs and the like in a microwave oven cavity in his U.S. Pat. No. 3,535,483.

Peter H. Smith shows an electronic oven in U.S. Pat. No. 3,300,615 wherein a turntable is rotated during the food cooking process to effect uniform cooking of the food product.

Louis H. Fitzmayer, in U.S. Pat. No. 3,626,135, shows another electronic oven with a rotatable turntable in the cavity thereof.

In U.S. Pat. No. 4,036,151, Yasuo Shin shows a microwave cooking apparatus wherein the turntable is removable so as to be disposed directly on the dining table after supporting the foodstuffs rotatably in the oven cavity during the cooking thereof.

Vladimir Kripchnikov et al, in U.S. Pat. No. 4,037,070, teach the use of a rotatable frame carried within the oven cavity and carrying dielectric cells onto which the food products are placed.

Ryuji Suzuki et al, in U.S. Pat. No. 4,092,512, show a turntable drive mechanism for use in an electronic oven wherein rotation of the turntable is induced by rotation of the rotary carriage by the effect of magnetic forces of the traction developed through the bottom wall of the oven between magnets on the turntable and magnets on the rotary carriage.

In U.S. Pat. No. 4,131,778, Junzo Tanaka et al show a magnetic coupling means for use in rotating a rotary table in a microwave oven cavity.

Koichi Tateda shows in U.S. Pat. No. 4,137,442 a microwave oven browning unit which is adjustably positionable within the oven cavity.

Thus, a large number of different devices have been developed in the microwave oven art for use in rotating foodstuffs being heated in the oven cavity or for effecting movement of the foodstuffs therein to provide improved uniform heating of the foodstuffs during the cooking operation.

SUMMARY OF THE INVENTION

The present invention comprehends an improved bi-rotational microwave oven turntable/rotisserie apparatus wherein a rotisserie device is rotated about a first axis defined by the drive shaft of the power supply and wherein the rotisserie includes a spit portion which is concurrently rotated about its longitudinal axis to effect a bi-rotational operation of the rotisserie in effecting a uniform cooking of meat products and the like carried thereby in the microwave oven cavity.

The invention further comprehends the provision in association with the rotisserie of a carrier member defining a turntable which is rotated concurrently with translation thereof about the axis of the drive shaft so as to provide a bi-rotational movement of the turntable for providing uniform microwave heating of foodstuffs placed on the turntable for cooking thereof in the oven cavity.

The invention further comprehends the provision of means interconnecting the turntable and rotisserie for effecting rotation of the rotisserie spit portion as an incident of rotation of the turntable portion about a central axis of the turntable portion.

The rotisserie may include a support portion carrying the split portion and connected to the drive shaft for rotation of the support portion and entire rotisserie about the axis of the drive shaft in the operation of the apparatus.

The turntable may be rotated by the drive shaft by means of a fixed tooth hub journaling the drive shaft. A gear carried on a shaft fixed to the center of the turntable meshes with the hub tooth portion to effect rotation of the turntable. The turntable shaft, in turn, is rotatably carried in the rotisserie support portion so as to follow a closed path about the axis of the drive shaft as an incident of rotation of the support portion about the drive shaft axis. Thus, the turntable is concurrently caused to rotate and have its center move about a closed path which may comprise a circular path to provide the desired bi-rotational movement thereof in effecting the improved uniform cooking of the foodstuffs carried thereon.

The turntable may comprise a dished member disposed subjacent the split portion of the rotisserie device. The periphery of the turntable may be toothed so as to define means for driving a complementary toothed disc fixed to the rotisserie spit portion for effecting the concurrent rotation of the spit portion and turntable, as discussed above.

The bi-rotational microwave oven turntable/rotisserie apparatus of the present invention is extremely simple and economical of construction while yet providing a highly improved means for effecting uniform heating of food products and the like being subjected to microwave energy in the microwave oven cavity.

BRIEF DESCRIPTION OF THE DRAWING

Other features and advantages of the invention will be apparent from the following description taken in connection with the accompanying drawing wherein:

FIG. 1 is a perspective view of a microwave oven having a turntable/rotisserie apparatus embodying the invention;

FIG. 2 is a front elevation with portions broken away to illustrate the arrangement of the turntable/rotisserie apparatus within the microwave oven structure;

FIG. 3 is a fragmentary enlarged top plan view of the turntable/rotisserie apparatus; and FIG. 4 is a vertical section taken substantially along the line 4—4 of FIG. 3.

DESCRIPTION OF THE PREFERRED EMBODIMENT

In the exemplary embodiment of the invention as disclosed in the drawing, a microwave oven apparatus generally designated 10 is shown to comprise an outer cabinet 11 having a front door 12 for providing controlled access to an internal oven cavity 13. Microwave energy is delivered to the oven cavity 13 from a generator 14 powered from a high voltage transformer 15. The microwave energy generated by generator 14 is delivered through a microwave guide 16 into the oven cavity for heating food products and the like F by the electromagnetic radiation.

As indicated above, it is desirable to move the food products within the oven cavity 13 during the heating operation so as to uniformly cook the food products. The present invention is concerned with means for effecting a desired bi-rotational movement of such food products for providing improved uniform cooking thereof in the oven.

More specifically, the invention comprehends a bi-rotational microwave oven turntable/rotisserie apparatus generally designated 17 disposed within the oven cavity 13. More specifically, the apparatus 17 includes a rotisserie device generally designated 18 and a turntable device generally designated 19.

Rotisserie device 18 includes a spit portion generally designated 20 and a support portion generally designated 21. The spit portion includes a spit shaft, or rod, 22 provided at one end with a handle 23 and at the opposite end with a sharp piercing point 24 for passing through food products, such as meat, and permitting the food products to be suitably disposed on a midportion 25 of the rotisserie shaft. Conventional holding prong devices 26 may be movably secured to the shaft 22 by conventional wing screws 27.

Support portion 21 defines a pair of upstanding legs 28 and 29 at opposite ends of a base portion 30. At its upper distal end, leg 28 is provided with a notched shaft support 31 and at its distal upper end, leg 29 is provided with a similar notched shaft support 32 for supporting the shaft for rotation about its longitudinal axis 33.

Turntable device 19 comprises a disc-shaped carrier defining a central axis 34 and a peripheral portion 35. As shown in FIG. 4, in the illustrated embodiment, peripheral portion 35 is upturned so as to cause the turntable to be effectively a dish member for collecting and retaining juices and the like which may be expressed from the food products during the cooking thereof.

As shown in FIG. 3, the turntable peripheral portion 35 may define a toothed edge 36 having meshed engagement with the toothed edge 37 of a wall member, illustratively comprising a drive disc, 38 fixedly mounted to rotisserie shaft 22 adjacent handle portion 23 and thus in spaced relationship to the pointed end 24. In the illustrated embodiment, notched shaft support 32 is formed of a synthetic resin so as to define a low friction slide surface against which the disc 38 rotatably rests in the operation of the rotisserie device 18.

Rotation of turntable device 19 and rotisserie device 18 is effected by means of an electric drive motor 39 which may be mounted in a lower portion 40 of the cabinet subjacent the bottom wall 41 of the oven cavity 13. As shown in FIG. 4, a drive stub shaft 42 has its end fixedly secured in the base portion 30 of the support 21. The stub shaft is journaled in a hub 43 having a locking tab 44 received in a suitable recess 45 in the oven wall 41 so as to prevent rotation of the hub. The hub 43 includes a toothed peripheral portion 46 superjacent the oven wall 41 and meshed with the toothed periphery 47 of a gear 48. A connector 49 is provided with a head portion 50 secured to the midportion of the turntable 19 by suitable screws 51. A shaft portion 52 extends downwardly from head portion 50 through a bearing 53 mounted in the support base portion 30. The lower end of the shaft 52 is fixedly secured coaxially to the gear 48. Thus, bearing 53 effectively journals shaft 52 and slidably supports the turntable through the interposed head portion 50 slidably resting on the top surface of the bearing, as seen in FIG. 4.

Referring to FIG. 4, rotation of shaft 42 by the drive motor 39 causes a rotation of the rotisserie support portion 21 about the vertical axis 54 of the drive shaft. Rotation of the base portion 30 causes concurrent movement of the turntable shaft 52 about the axis 54 in a closed circular path. Such movement of the shaft 52 causes gear 48 secured thereto to rotate the turntable device 19 about central axis 34 as gear 48 walks around the toothed portion 46 of the hub 43.

Rotation of the turntable 19 causes toothed edge 36 thereof to effect rotation of disc 38, which is in meshed engagement therewith, as seen in FIGS. 3 and 4, so as to effect concurrent rotation of disc 38 and rotisserie shaft 22 to which the disc 38 is fixed about longitudinal axis 33. As a result, rotation of the rotisserie shaft is effected as an incident of rotation of the turntable 19.

As seen in FIG. 4, the rotisserie device 18 is asymmetrically disposed relative to the drive shaft axis 54 so that a food product carried on the shaft between the prong devices 26 may move in an annular path about the vertical axis 54 while, at the same time, the food product is rotated about the axis 33 of the rotisserie shaft 22.

Food products placed on turntable 19 are caused to move along the circular path about the vertical axis 54 (a first axis) while, at the same time, the rotation of turntable 19 about central axis 34 (a second axis) causes a bi-rotational movement of the food products placed on turntable 19 for improved uniform heating thereof. A food product carried on the shaft 22 of spit portion 20 about longitudinal axis 33 (a third axis) via support 21 thus also has a bi-rotation movement about two distinct axes, 33 and 54 during the cooking operation for improved uniform heating thereof.

As indicated above, the periphery of the turntable may be upturned to collect juices and the like developed during the cooking operation. The turntable is disposed subjacent the rotisserie spit portion so as to collect juices dropping therefrom and thereby maintain the oven bottom wall 41 clean.

As the stub shaft 42 may be moved upwardly through hub 43, the entire apparatus 17 may be removed from the oven cavity, as desired. Reinstallation is effected simply by reinserting the stub shaft downwardly through the hub so as to again have driving engagement with drive motor 39. Further, as will be obvious to those skilled in the art, the spit portion of the rotisserie may be readily removed from its supportive association with the notched elements 31 and 32 so as to permit the apparatus 17 to function solely as a rotatable turntable apparatus.

As will be obvious to those skilled in the art, the number of revolutions of the turntable about axis 34 for each rotation of the axis about the axis 54 may be suitably controlled by selection of the ratio of teeth on the hub 43 to the teeth on gear 48. In one illustrative embodiment of the invention, the arrangement of the gearing was such as to provide one turn of the turntable for three rotations of the motor shaft. Where the motor shaft rotates at approximately 4¾ revolutions per minute, the turntable thusly rotates at approximately 1½ revolutions per minute. Illustratively, in one embodiment, the spit was caused to rotate two times for each rotation of the turntable and, thus, was caused to rotate at a speed of approximately 3 revolutions per minute.

The improved uniform distribution of heating effected by use of the bi-rotational apparatus 17 provides improved efficiency in the use of the microwave energy and has been found to facilitate thawing of frozen food products. In addition, the use of the bi-rotational apparatus of the present invention provided crisper exteriors and faster cooking with minimum attention by the user of the microwave oven so as to provide an overall substantially improved cooking operation.

The foregoing disclosure of specific embodiments is illustrative of the broad inventive concepts comprehended by the invention.

We claim:

1. Structure for movably carrying food products in a microwave oven cavity for improved subjection thereof to microwave energy therein, said carrying structure comprising:
    a spit;
    support means for supporting said spit in said cavity for rotation about a first, spit axis;
    drive means for rotatively turning said support means about a second, fixed axis;
    a turntable for supporting food products;
    means rotatively mounting said turntable to said support means for revolving about a third axis spaced from said second axis;
    means for rotatively driving said turntable about said second axis while revolving about said third axis; and
    means driven by the turntable for causing said spit to rotate about said first axis as an incident of said turntable being rotatively driven about said second axis.

2. The food product carrying structure of claim 1 wherein said third axis is moved along an annular path as an incident of rotation of said support means.

3. The food product carrying structure of claim 1 wherein said means for causing said spit to rotate about said first axis comprises a driven gear.

4. The food product carrying structure of claim 1 wherein said means for causing said spit to rotate about said first axis comprises toothed means.

5. The food product carrying structure of claim 1 wherein said turntable comprises a dished member.

6. The food product carrying structure of claim 1 wherein said turntable comprises a plate member having a toothed periphery, and said spit is provided with a toothed driven member meshing with said toothed periphery for rotating said spit about said first axis as an incident of rotation of said plate member about said third axis.

7. In a microwave oven having an oven cavity and a rotisserie device disposed in said oven cavity and having a turntable and a spit rotatively carried on a support, the improvement comprising:
    first rotating means for rotating the turntable about a turntable axis and revolving the turntable about a fixed axis spaced from said turntable axis; and
    second rotating means driven by the revolving turntable for rotating the spit about its longitudinal axis and concurrently about said fixed axis.

8. The microwave oven structure of claim 7 wherein said spit defines a rod intersecting said turntable axis and extending asymmetrically radially therefrom.

9. The microwave oven structure of claim 7 wherein said second rotating means comprises toothed drive means.

10. The microwave oven structure of claim 7 wherein said second rotating means comprises gear means.

11. The microwave oven structure of claim 7 wherein said turntable defines drip collecting means subjacent said rotisserie spit portion.

12. The microwave oven structure of claim 7 wherein said first rotating means includes a fixed hub and a rotative drive shaft journaled in said hub and fixedly connected to said support, and means engaging said hub for revolving said turntable about said turntable axis.

13. In a microwave oven having an oven cavity, a turntable, and a rotisserie device disposed in said oven cavity and having a support portion and a spit portion carried by the support portion, the improvement comprising:
    first rotating means for rotating the support portion about a first axis;
    second rotating means for rotating the spit portion about a second axis concurrently with the rotation of the support portion about said first axis; and
    means for rotatably mounting said turntable to said support portion for revolution about said first axis while concurrently rotating said turntable about a third axis extending parallel to and spaced radially from said first axis.

14. The microwave oven structure of claim 13 wherein said first axis is vertical and said second axis is inclined to the vertical.

15. The microwave oven structure of claim 13 wherein said turntable defines an upwardly opening dish-shaped member subjacent said spit portion.

16. The combination in a microwave oven of:
    a rotatable spit for support of food articles; and
    drive means having a single rotatable input drive shaft and means driven by rotation of said drive shaft about a fixed drive shaft axis for causing said spit to concurrently (a) rotate about its longitudinal axis, and (b) revolve about said fixed drive shaft axis and (c) rotate about an axis spaced from said fixed drive shaft axis for improved distribution of microwave energy throughout food articles being cooked.

17. The combination in a microwave oven of:
    a turntable for support of food articles which turns during a cooking operation for uniform distribution of microwave energy throughout the food;
    a rotatable spit for support of food articles which also turns during the cooking operation; and
    drive means for driving the turntable and causing the driven turntable to rotate said spit, said turntable revolving about a fixed drive axis, and rotating about an axis spaced from said fixed drive axis, said turntable having driving projections on its periphery which cooperate with driven means attached to the spit.

18. The combination claimed in claim 17 wherein the driven means comprises a gear.

19. The combination claimed in claim 17 wherein the driven means is a wall member spaced from a pointed end of the spit.

20. The combination claimed in claim 17 wherein the turntable has a peripheral edge which is upturned to retain liquids.

21. The combination in a microwave oven having means forming a cavity for cooking food of:

a turntable within the cavity for rotational support of food articles undergoing cooking in the oven;

drive means for rotating the turntable about a first axis and concurrently revolving the rotating turntable about a second parallel axis for facilitated distribution of microwave energy throughout food undergoing cooking in the oven;

additional support means within said cavity for supporting food articles undergoing cooking in the oven; and additional drive means cooperating with said first named drive means for causing said additional support to have three different concurrent movements including rotation about said first axis, revolution about said second axis, and an additional movement.

22. The combination in a microwave oven having means forming a cavity for cooking food of:

a turntable within the cavity for rotational support of food articles undergoing cooking in the oven;

drive means for rotating the turntable about a first axis and concurrently revolving the rotating turntable about a second parallel axis for facilitated distribution of microwave energy throughout food undergoing cooking in the oven; and a rotatable spit, said drive means further including means for rotating the spit about a third axis during the cooking operation, said spit being further rotated about said second axis during turning of the turntable for rotational movement of food articles supported by said spit during a cooking operation in said oven for uniform heating of said food articles.

* * * * *